United States Patent
Lee

(10) Patent No.: US 7,158,246 B1
(45) Date of Patent: Jan. 2, 2007

(54) METHOD FOR CONTROLLING FAX DATA TRANSMISSION ACCORDING TO AN OUTPUTTING WAY OF A RECEIVING PART

(75) Inventor: Sung-Soo Lee, Kyonggi-do (KR)

(73) Assignee: Samsung Electronics, Co., Ltd., Suwon-si (KR)

( * ) Notice: Subject to any disclaimer, the term of this patent is extended or adjusted under 35 U.S.C. 154(b) by 0 days.

(21) Appl. No.: 09/580,221

(22) Filed: May 26, 2000

(30) Foreign Application Priority Data

Jul. 14, 1999 (KR) .................................. 99-28465

(51) Int. Cl.
G06F 15/00 (2006.01)
H04N 1/00 (2006.01)

(52) U.S. Cl. ..................... 358/1.15; 358/434; 358/435; 358/436; 358/439

(58) Field of Classification Search ................ 358/434, 358/435, 436, 439, 440, 442, 1.15, 1.13
See application file for complete search history.

(56) References Cited

U.S. PATENT DOCUMENTS

| 4,661,857 | A |   | 4/1987  | Kondo            |         |
|-----------|---|---|---------|------------------|---------|
| 4,876,609 | A | * | 10/1989 | Ogura            | 358/443 |
| 5,282,050 | A | * | 1/1994  | Ishizuka et al.  | 358/400 |
| 5,515,177 | A |   | 5/1996  | Propach et al.   |         |
| 5,528,385 | A | * | 6/1996  | Manning          | 358/468 |
| 5,796,493 | A |   | 8/1998  | Murai et al.     |         |
| 5,826,133 | A | * | 10/1998 | Saito et al.     | 399/2   |
| 5,872,900 | A | * | 2/1999  | Tsuchitoi        | 358/1.12|
| 5,877,870 | A |   | 3/1999  | Sakai            |         |
| 5,907,599 | A |   | 5/1999  | Sakayama et al.  |         |
| 6,040,922 | A |   | 3/2000  | Umeda et al.     |         |
| 6,154,286 | A | * | 11/2000 | Konno et al.     | 358/1.13|
| 6,278,524 | B1| * | 8/2001  | Kujirai et al.   | 358/1.11|
| 6,449,063 | B1| * | 9/2002  | Yoshida et al.   | 358/400 |
| 6,563,606 | B1| * | 5/2003  | Yoshida          | 358/439 |
| 6,693,729 | B1| * | 2/2004  | Bloomfield       | 358/402 |
| 6,972,858 | B1| * | 12/2005 | Nishida et al.   | 358/1.15|

FOREIGN PATENT DOCUMENTS

JP 0327493 A * 12/1991
JP 08102841 A * 4/1996

OTHER PUBLICATIONS

A copy of translation of Japanese Published Unexamined Patent Applicant (A) No. 03-274943.*

* cited by examiner

Primary Examiner—Douglas Q. Tran
Assistant Examiner—Chan S. Park
(74) Attorney, Agent, or Firm—Robert E. Bushnell, Esq.

(57) ABSTRACT

Disclosed is a method for controlling transmission of fax data according to a data outputting way of a receiving part, the method comprising the steps of: scanning and storing a document to be transmitted from a facsimile of a transmitting part to a facsimile of the receiving part; when the document is completely scanned, dialing a pre-inputted telephone number of the receiving part; after the receiving part telephone number is dialed, requiring and receiving the data outputting way from the receiving part facsimile, in the case that a call for transmitting data of the document is connected between the transmitting part facsimile and the receiving part facsimile; and transmitting the stored document data according to the received data outputting way.

17 Claims, 5 Drawing Sheets

METHOD FOR CONTROLLING FAX DATA TRANSMISSION ACCORDING TO AN OUTPUTTING WAY OF A RECEIVING PART

CLAIM OF PRIORITY

This application makes reference to, incorporates the same herein, and claims all benefits accruing under 35 U.S.C. §119 from an application entitled Method for Controlling Fax Data Transmission According to the Printing Method of Receiver earlier filed in the Korean Industrial Property Office on 14 Jul. 1999, and there duly assigned Serial No. 99-28465 by that Office.

BACKGROUND OF THE INVENTION

1. Field of the Invention

This invention relates to a method for controlling transmission of facsimile data. More specifically, the invention relates to a method for transmitting facsimile data from a memory of a transmitting part facsimile to a receiving part facsimile in order or in reversed order according to a facsimile data receiving and outputting way of the receiving part facsimile.

2. Description of the Related Art

Generally, a facsimile is a machine for exchanging documents. In the facsimile, a scanner for scanning a document, a printer for outputting data in the shape of letters, and a communication unit for transmitting and/or receiving data to and/or from another part in wide area are integrally formed. Such a facsimile includes a variety of additional functions to meet demands of users. As one of the additional functions, facsimile data is scanned and stored in a memory before being transmitted. The facsimile data scanned and stored in the memory is advance-transmitted from a transmitting part facsimile to a receiving part facsimile in order from the first page regardless of the facsimile (fax) data outputting way of the receiving part facsimile. At this time, the receiving part needs to realign the fax data on every reception of the fax data.

Exemplars of the art, U.S. Pat. No. 5,877,870 for Image Transmission Control Method for Facsimile Apparatus issued to Sakai, U.S. Pat. No. 5,515,177 for Facsimile Data Transmission over a Low Rate Network by One Dimensional Decoding and Two Dimensional Re-encoding issued to Propach et al., U.S. Pat. No. 4,661,857 for Facsimile Communication Control Method issued to Kondo, U.S. Pat. No. 6,040,922 for Devices and Method for Facsimile and Data Communication issued to Umeda et al., U.S. Pat. No. 5,907,599 for Facsimile Communication Method and Facsimile Machine issued to Sakayama et al. and U.S. Pat. No. 5,796,493 for Facsimile Machine issued to Murai et al. disclose the data transmission for a facsimile device.

I have found that conventional art does not properly show an efficient way for the receiving part facsimile to avoid reordering the facsimile data on every reception.

SUMMARY OF THE INVENTION

It is therefore an object of the present invention to provide a method for transmitting fax data stored in the memory of the transmitting part facsimile to the receiving part facsimile according to the fax data outputting way of the receiving part facsimile.

It is another object to have a more efficient method of organizing facsimile data for printing on a receiving part facsimile.

It is yet another object to have a method supporting a non-standard mode while avoiding the receiving part to realign the fax data on every reception of the fax data.

It is another object to have a system that will give a visual feedback to the user on the transmitting part facsimile about the ordering method of the data set by the receiving part facsimile.

The above and other objects are provided according to the present invention by providing a method for controlling transmission of fax data as described hereinafter. A document to be transmitted from a transmitting part facsimile to a receiving part facsimile is scanned and stored. When the document is completely scanned, a pre-entered telephone number of the receiving part is dialed. After the receiving part telephone number is dialed, a data outputting way is required and received from the receiving part facsimile, in the case that a call for transmitting document data is fixed between the transmitting part facsimile and the receiving part facsimile. Then the document data stored according to the received data outputting way is transmitted.

Preferably, the method for controlling transmission of fax data further includes the step of displaying the data outputting way of the receiving part facsimile received from the receiving part facsimile. The data outputting way applied to the present invention may be one of a face down way in which the stored document data is output in order from the first page of the stored document data; and a face up way in which the stored document data is output in reversed order from the last page of the stored document data.

In addition, according to the present invention, both of the transmitting part facsimile and the receiving part facsimile support a non-standard mode and report the data outputting way by fixing a data outputting way mode bit. Moreover, the scanned document data is managed in the unit of pages and stored in the memory.

BRIEF DESCRIPTION OF THE DRAWINGS

A more complete appreciation of this invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENTS

Figure 1:
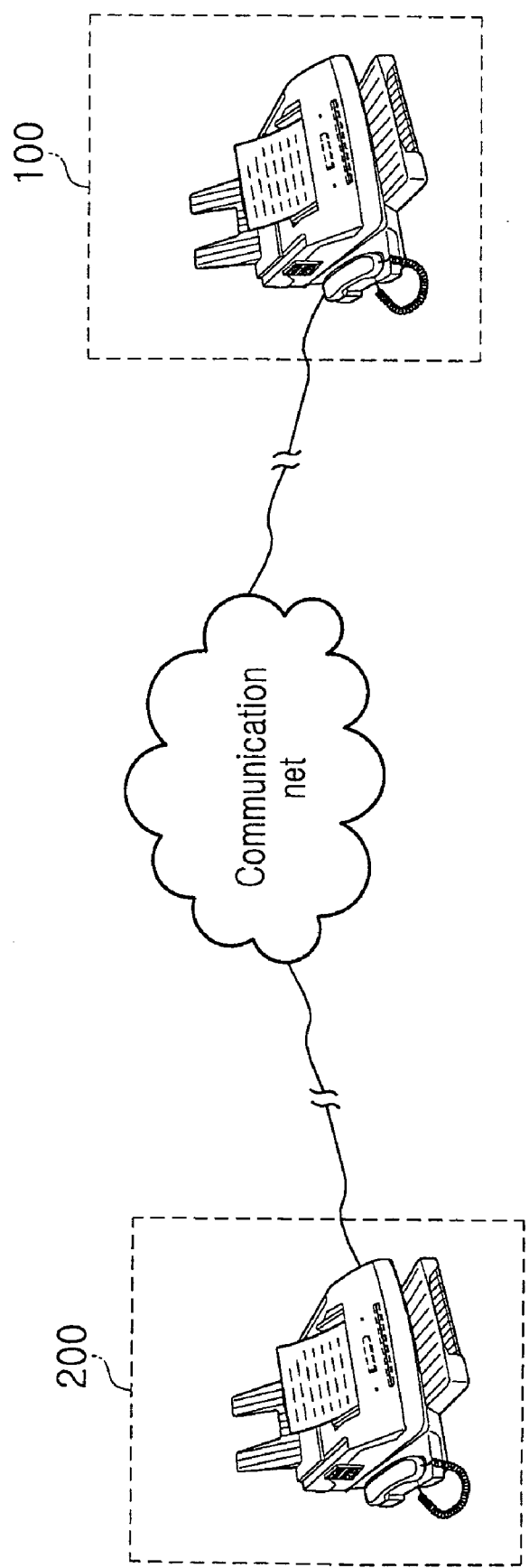
FIG. 1 is a perspective view of facsimiles interconnected to perform the present invention.

Turning now to the drawings, as shown in FIG. 1, a transmitting part facsimile 100 is connected to a receiving part facsimile 200 by means of a communication net so that data can be exchanged between the facsimiles 100 and 200.

Figure 2:
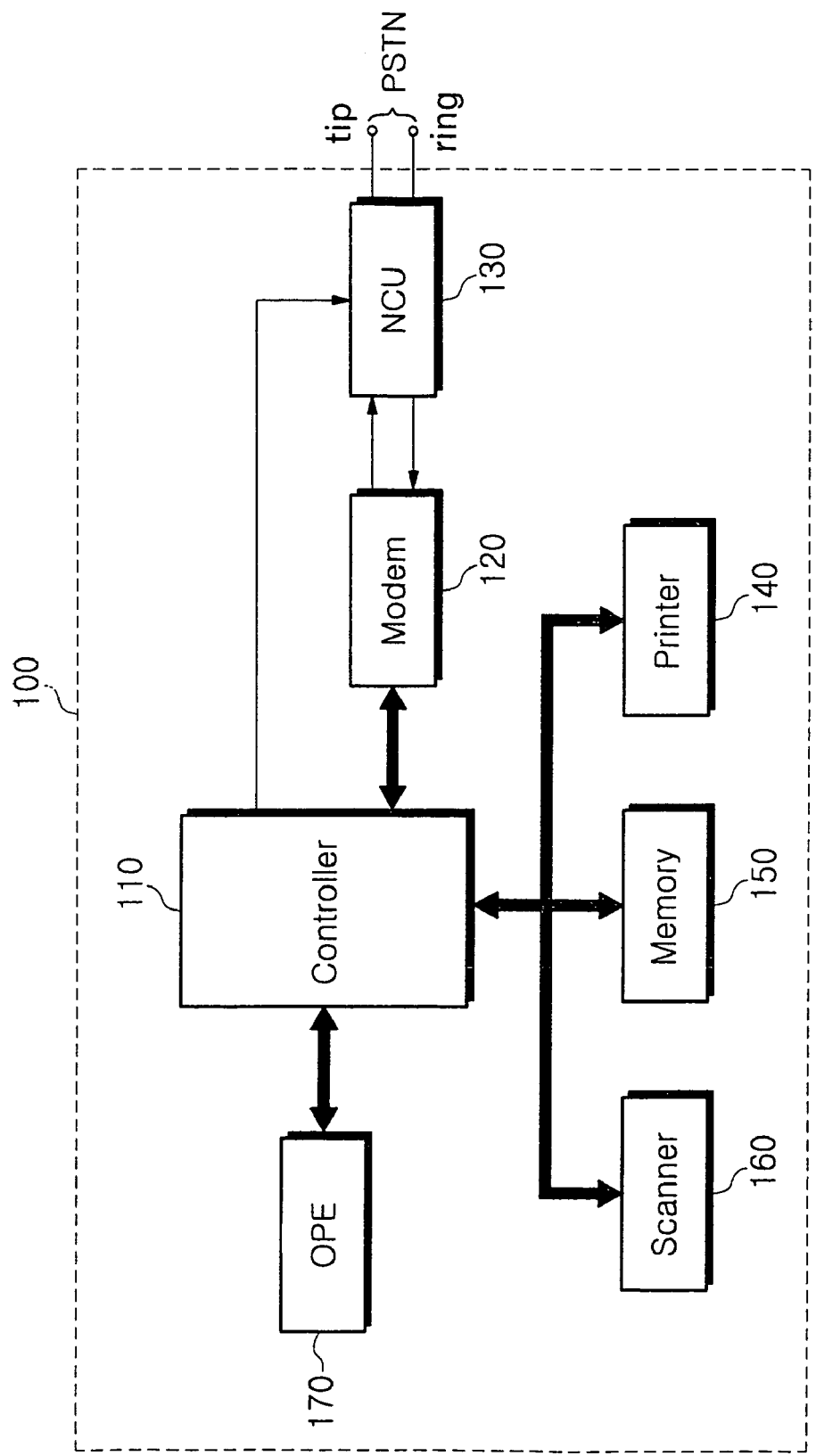
FIG. 2 is a block diagram of a facsimile for performing the present invention.

Referring to FIG. 2, a controller 110 generally controls the transmitting part facsimile 100 according to a system program that is fixed in a memory 150 to operate the facsimile 100. In addition, the controller 110 controls a method for transmitting fax data stored in the memory 150 to the receiving part facsimile 200 corresponding to a fax data outputting way transmitted from the receiving part facsimile 200.

In the memory 150, the system program for operating the transmitting part facsimile 100, and contents related to transmission and reception of protocol data and letter data are stored. According to the present invention, pre-scanned document data to be advance-transmitted is stored in the memory 150 and transmitted to the receiving part facsimile 200 by a transmission signal from the controller 110.

Figure 5:
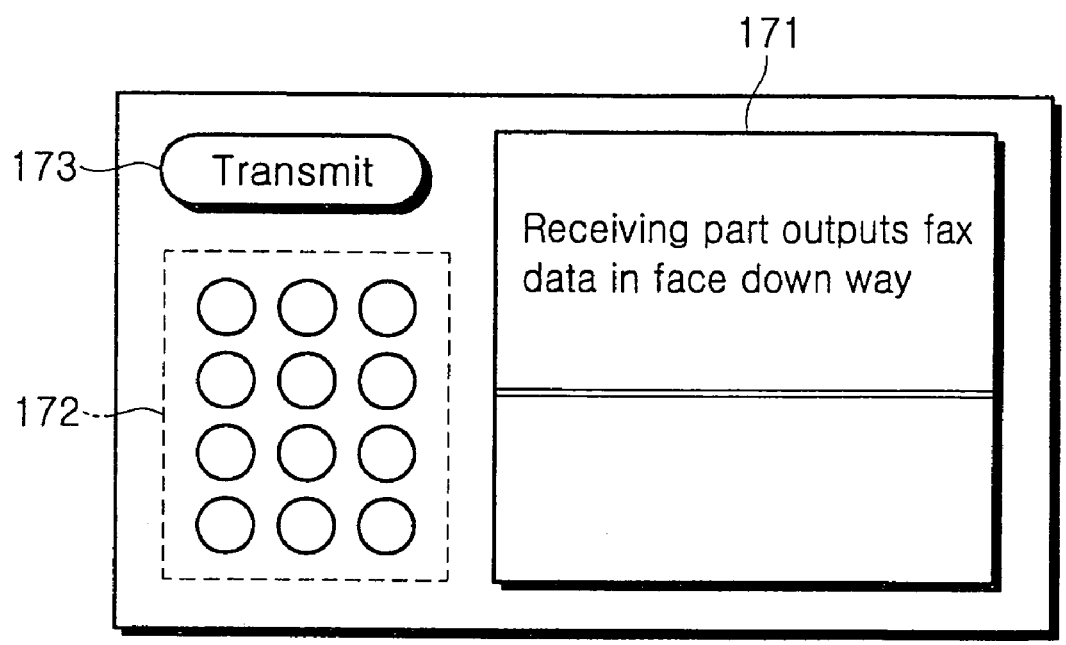
FIG. 5 is an embodiment of a display in a transmitting part facsimile after the outputting way of the receiving part is detected according to the present invention.

An operational panel (OPE) 170 includes, as shown in FIG. 5, a plurality of keys 172 and 173 for generating key data of the transmitting part facsimile 100. When generated, the key data is input into the controller 110. The OPE 170 further includes a displaying unit 171 for displaying the processed state of various operations of the controller 110 and display data such as system information. In addition, according to the present invention, the data outputting way of the receiving part facsimile 200 which is transmitted from the receiving part facsimile 200 is displayed on the displaying unit 171.

A scanner 160 scans data of the document, converts the scanned data into digital image data, and supplies the controller 110 with the converted digital image data. A modem 120 modulates and outputs output data of the controller 110 into analog form and demodulates and outputs analog input signals by control of the controller 110.

A network control unit (NCU) 130 is operated to form a communication loop of a public switching telephone network (PSTN) formed of a ring and a tip and interface signals of the modem 120 and the PSTN by control of the controller 110. A printer 140 outputs print data stored in the memory 150 by a print signal from the controller 110.

Figure 3:
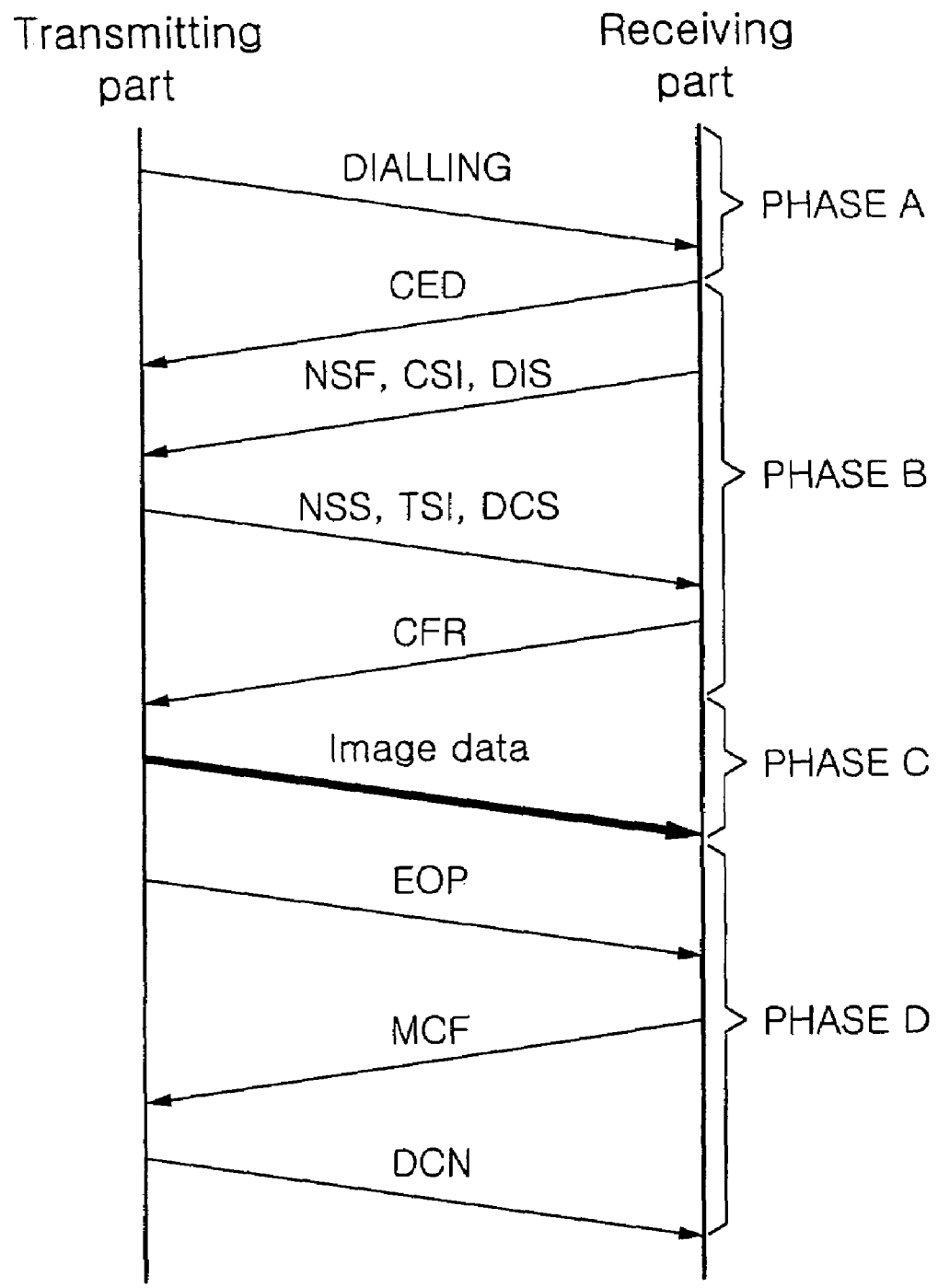
FIG. 3 is a conceptional view of protocols for transmitting and receiving fax data.
Figure 4:
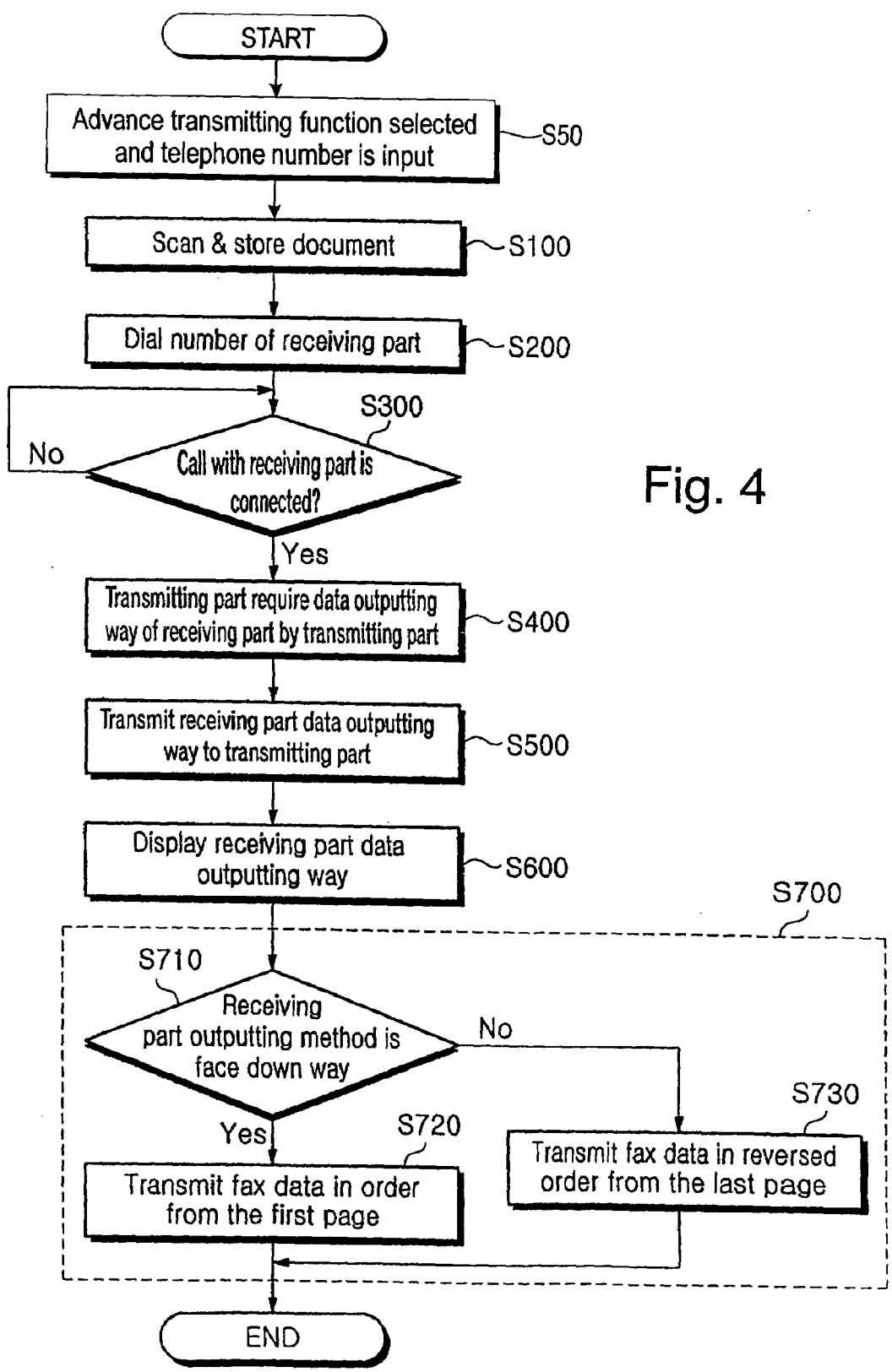
FIG. 4 is a flowchart of a method for controlling transmission of fax data according to a outputting way of a receiving part.

Referring to FIG. 3, Phase A is a sequence of fixing a call and establishing a communication line. In the case of a manual operation, the transmitter dials the telephone number of the receiving part under the off-hook state, senses the bell sound of 16 Hz from the receiving part subscriber, checks whether the receiving part is hooked off, and connects the facsimile to the communication line when it is checked that the receiving part is hooked off. In the case of an automatic operation, when the facsimile is connected to the communication line and the receiving part facsimile is in a fax mode, a 1100 Hz tone is transmitted from the transmitting part to the receiving part for 0.5 second at an interval of 3 seconds until the receiving part responds. At this time, the receiving part transmits a 2100 Hz tone for 2.6 to 4 seconds. The receiving part transmits the called equipment discrimination signal (CED).

Phase B is a sequence of checking the states of a terminal and a transmission line and controlling the terminal. In Phase B, the transmitting and receiving standby states of the terminal, display and determination of a terminal constant and synchronizing state are checked and a fax message is prepared to be transmitted.

Phase C is divided into Phase C1 for control during message transmission and Phase C2 for transmission of the fax message. In other words, Phase C is a sequence of transmitting the message, checking the message transmission, and maintaining synchronism.

Phase D is a sequence of terminating the message and terminating reception and so on. The disconnection command signal (DCN) would be sent by the transmitting part to the receiving part. In the case of continuous transmission, Phase D is followed by Phase B or Phase C to repeat the transmitting sequence.

In addition, signals used in the protocols as shown in FIG. 3 will be described hereinafter. Non-standard facilities (NSF) is used to discriminate demands of a specific user that cannot be covered by T recommendation. ITU-T (International Telecommunications Union) recommendation sets a protocol for facsimile calls. Called subscriber identification (CSI) is used to supply a specific discriminating member of a subscriber of a receiving part by an international telephone number. Digital identification signal (DIS) specifies a standard CCITT (Consultive Committee International Telegraph and Telephone) capability of the receiving part equipment.

In addition, non-standard facilities set-up (NSS) is a digital command responding to information included in an NSF signal. Transmitting subscriber identification (TSI) reports that the continuous information is the discriminating member of the transmitting part, and supplies facsimile procedure with additional security information. Digital command signal (DCS) is a digital setup command responding to a standard capacity checked by the DIS signal.

Confirmation to receive (CFR) is a digital response confirming that the entire previous message procedure is completed and the message transmission starts. End of procedure (EOP) is a response that the message transmission is completed. In addition, message confirmation (MCF) reports that the entire message is satisfactorily received and displays whether an additional message exists or not.

Referring to FIGS. 1 to 5, the method for controlling transmission of fax data according to the outputting way of the receiving part of the present invention will be described hereinafter.

First, an advance-transmitting function is selected. Then, the telephone number of the receiving part facsimile 200 is input using the number and letter generating unit 172 of the OPE 170 as shown in FIGS. 2 and 5 (S50). In order to transmit fax data from the transmitting part facsimile 100 to the receiving part facsimile 200, a document is scanned and stored in the memory 150 (S100). When the document is completely scanned, the controller 110 dials the pre-inputted telephone number of the receiving part facsimile 200 to transmit the data stored in the memory 150 (S200). After the telephone number is dialed, it is determined whether a call for exchanging fax data between the transmitting part facsimile 100 and the receiving part facsimile 200 is connected or not (S300).

The determination as to whether the call is connected can be checked through predetermined protocol exchanges after a dialing signal is received from the controller 110 shown in FIG. 2 to the receiving part facsimile 200. If it is determined that the call for exchanging the fax data between the transmitting part facsimile 100 and the receiving part facsimile 200 is formed, the transmitting part requires the fax data outputting way of the receiving part facsimile 200 (S400).

The requirement of the fax data outputting way is performed in Phase B that is a sequence of generally checking the states of the facsimile and the transmission line and controlling the facsimile among the protocols used for transmission and reception of the fax data as shown in FIG. 3. As described above, in Phase B, the facsimile transmission and reception standby state and synchronization state are checked and the fax message is prepared to be transmitted. In other words, the transmitting part facsimile 100 requires the fax data outputting way applied to the receiving part facsimile 200 to be reported in Phase B.

According to a preferred embodiment of the present invention, T.30 protocol is applied to transmission and reception. In the case that the transmitting part and the receiving part respectively support a non-standard mode, the receiving part reports the fax data outputting way through a prefixed (predetermined) fax data outputting way mode bit.

When required to report the fax data outputting way, the receiving part facsimile 200 transmits a presently applied fax data outputting way to the transmitting part facsimile 100 (S500).

Receiving the fax data outputting way of the receiving part facsimile 200, the transmitting part facsimile 100 displays the received fax data outputting way on the displaying unit 171 of the OPE 170 as shown in FIG. 5 (S600). After the fax data outputting way is displayed, the fax data stored in the memory 150 is transmitted to the receiving part facsimile 200 according to the displayed fax data outputting way (S700).

The fax data outputting way of the receiving part facsimile 200 applied to the present invention is one of a face down way in which document data stored in the memory 150 is output in order from the first page thereof and a face up way in which document data is output in reversed order from the last page thereof.

Step S700 will be described more in detail. After the fax data outputting way is displayed at step S600, it is determined whether the fax data outputting way is the face down way or not (S710). If it is determined that the fax data outputting way is the face down way, the document data stored in the memory 150 is transmitted to the receiving part facsimile 200 in order from the first page of the document data (S720). Otherwise, if it is determined that the fax data outputting way is the face up way, the document data stored in the memory 150 is transmitted to the receiving part facsimile 200 in reversed order from the last page of the document data (S730).

As described above, the present invention divides and stores the fax data into units of pages and transmits the fax data in order or in reversed order according to the fax data outputting way of the receiving part when the fax data is advance-transmitted in the memory. Accordingly, the fax data does not need to be realigned when received which results in an enhanced convenience.

This invention has been described above with reference to the aforementioned embodiments. It is evident, however, that may alternatives, modifications and variations will be apparent to those having skill in the art in light of the foregoing description. Accordingly, the present invention embraces all such alternatives, modifications and variations as fall within the spirit and scope of the appended claims and their equivalents.

What is claimed is:

1. A method for controlling transmission of fax data according to a data output order of a facsimile receiving part, the method comprising the steps of:
   scanning and storing a document into data to be transmitted from a facsimile transmitting part to said facsimile receiving part;
   selecting an advance-transmitting function to accommodate requiring said data output order;
   dialing a predetermined telephone number of said facsimile receiving part when said document is completely scanned;
   requiring and receiving said data output order by said facsimile transmitting part from said facsimile receiving part after the telephone number of said facsimile receiving part is dialed;
   displaying said data output order received from said facsimile receiving part, on a display of said facsimile transmitting part; and
   transmitting by said facsimile transmitting part, said stored document data in the same order as said displayed data output order.

2. The method of claim 1, with said data output order being either a face down way or a face up way, said face down way being said stored document data outputted in order from a first page to a last page of said stored document data, said face up way being said stored document data outputted in reversed order from a last page to a first page of said stored document data.

3. The method of claim 1, with both of said facsimile transmitting part and said facsimile receiving part supporting a non-standard mode, said facsimile receiving part reporting said data output order to said facsimile transmitting part by sending a predetermined bit of data.

4. The method of claim 1, with said scanned document data being managed in a unit of a page and being stored in a memory of said facsimile transmitting part.

5. The method of claim 1, with said requiring of said document order being made during Phase B of a facsimile transmission, Phase B being a sequence of checking states of said facsimile transmitting part and a transmission line and controlling said facsimile transmitting part among a plurality of predetermined protocols used in transmission and reception of facsimile data.

6. The method of claim 1, with said dialing a predetermined telephone number of said facsimile receiving part being automatic.

7. A method, comprising the steps of:
   scanning a document into data to be transmitted from a facsimile transmitting part to a facsimile receiving part;
   storing said data of said document in a memory of said facsimile transmitting part;
   selecting an advance-transmitting function to accommodate requiring a data output order of the facsimile receiving part;
   making a call by dialing a predetermined telephone number of said facsimile receiving part when said document is completely scanned and stored in said memory;
   checking whether said call between said facsimile transmitting part and said facsimile receiving part is connected;
   requiring a said data output order by said facsimile transmitting part from said facsimile receiving part when said call is connected;
   receiving said data output order by said facsimile receiving part from said facsimile transmitting part after said requiring of said data output order;
   displaying said data output order received from said facsimile receiving part on a display of said facsimile transmitting part; and
   transmitting said data of said document stored in said memory in the same order as said displayed data output order.

8. The method of claim 7, with said dialing the predetermined telephone number being automatically dialed when said document is completely scanned.

9. The method of claim 8, with said data output order being either a face down way or a face up way, said face down way being said stored document data outputted in order from a first page to a last page of said stored document data, said face up way being said stored document data outputted in reversed order from a last page to a first page of said stored document data.

10. The method of claim 9, with both of said facsimile transmitting part and said facsimile receiving part supporting a non-standard mode, said facsimile receiving part reporting said data output order to said facsimile transmitting part by sending an output order mode bit.

11. The method of claim 10, with said scanned document data being managed in a unit of a page.

12. The method of claim 7, further comprised of displaying said data output order when said data output order is received from said facsimile receiving part on said display on said operational panel.

13. A facsimile transmitting part apparatus, comprising:
- a scanner of said facsimile transmitting part scanning data of a document and converting the data into digital image data;
- a unit selecting an advance-transmitting function to accommodate requiring a document output order of the facsimile receiving part;
- a control unit utilizing the digital image data from said scanner, said control unit controlling said facsimile transmitting part according to a system program, said control unit requiring and receiving said document output order from said facsimile receiving part, said document output order being an order of document pages determined by and being printed on said facsimile receiving part;
- a display unit displaying the received document output order;
- a memory storing said system program guiding said control unit, the digital image data from the document being stored in said memory before being transmitted to said facsimile receiving part by a transmission signal from said controller in the same order as the displayed document output order;
- an operational panel having a plurality of keys generating key data of said facsimile transmitting part to said control unit and said display unit;
- a modem through a control of said control unit modulating said digital image data into analog data formatted for transmission over a public telephone network; and
- a network control unit forming a communication loop of the public telephone network having a ring and a tip and interface signals of said modem, the public telephone network being connected to said facsimile receiving part.

14. The apparatus of claim 13, with said document output order being either a face down way or a face up way, said face down way being said stored document data outputted in order from a first page to a last page of said stored document data, said face up way being said stored document data outputted in reversed order from a last page to a first page of said stored document data.

15. The apparatus of claim 14, with both of said facsimile transmitting part and said facsimile receiving part supporting a non-standard mode, said facsimile receiving part reporting said data output order to said facsimile transmitting part by sending a predetermined bit of data.

16. The apparatus of claim 15, with said digital image data being managed in a unit of a page.

17. The apparatus of claim 16, with said requiring of said document output order being made during Phase B of a facsimile transmission, Phase B being a sequence of checking states of said facsimile transmitting part and a transmission line and controlling said facsimile transmitting part among a plurality of predetermined protocols used in transmission and reception of facsimile data.

* * * * *